Nov. 15, 1955        R. H. MANNING        2,723,642
COMBINATION SPEEDOMETER AND FUEL METER FOR AUTOMOBILES
Filed March 20, 1953        2 Sheets-Sheet 1
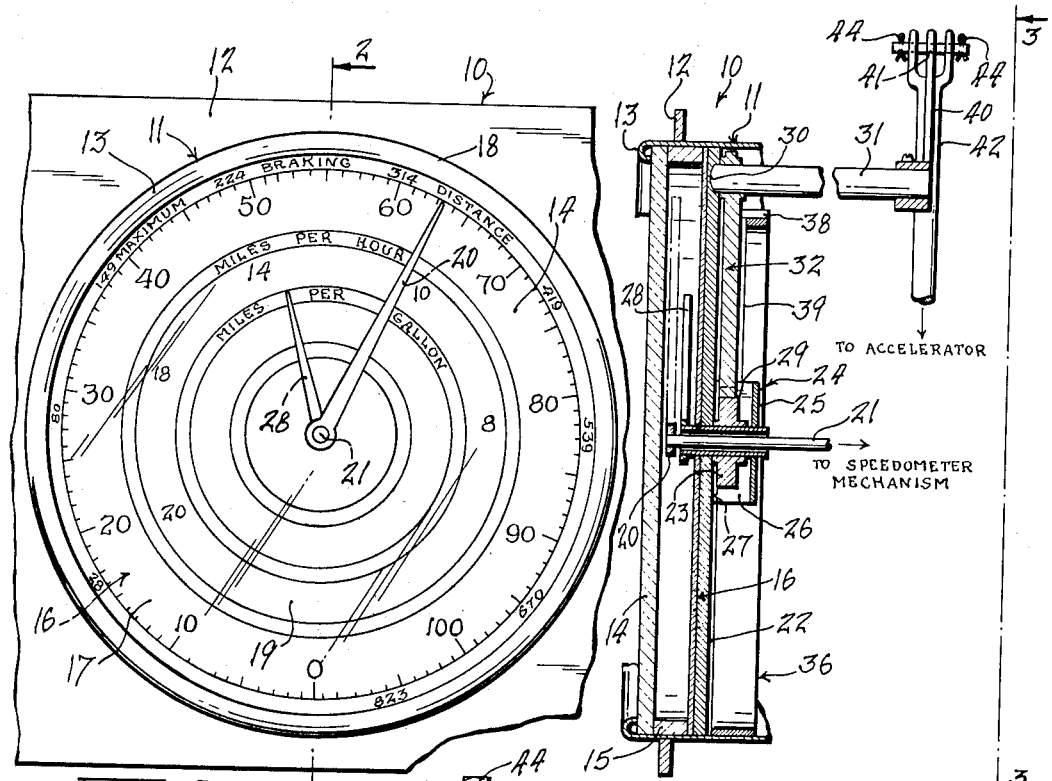
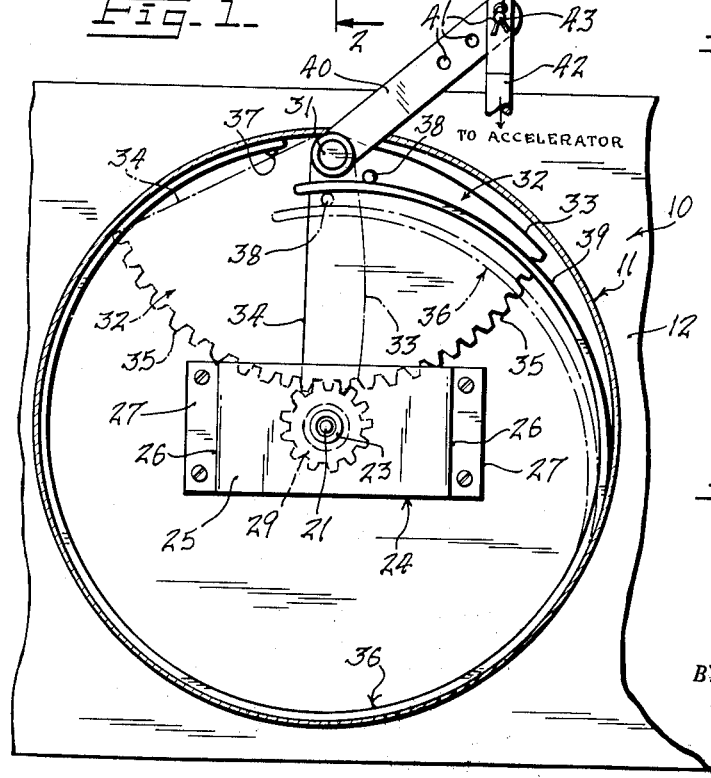
INVENTOR.
RICHARD H. MANNING
BY
*Julian H. Holecek*
ATTORNEY Nov. 15, 1955  R. H. MANNING  2,723,642
COMBINATION SPEEDOMETER AND FUEL METER FOR AUTOMOBILES
Filed March 20, 1953  2 Sheets-Sheet 2
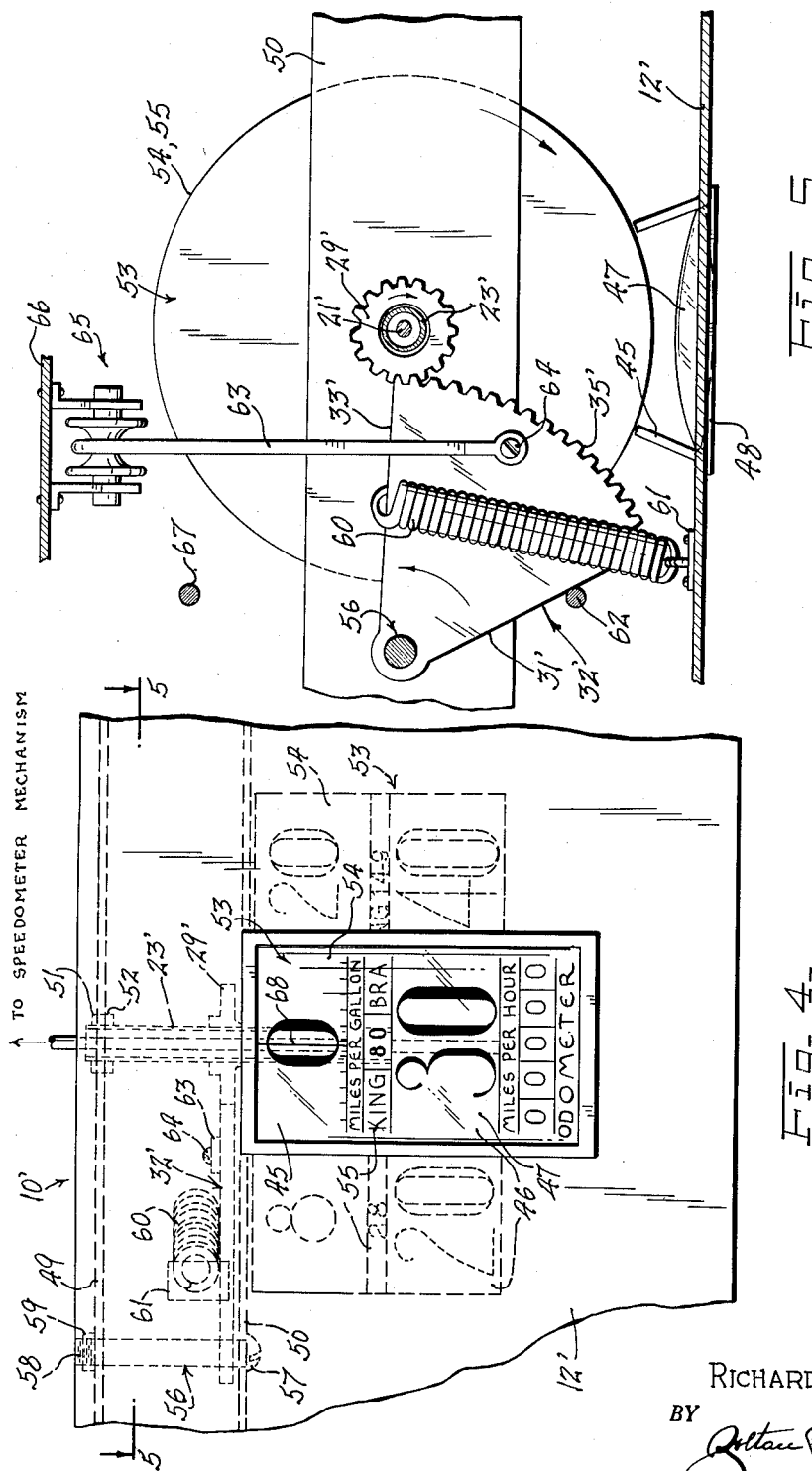
INVENTOR.
RICHARD H. MANNING
BY
ATTORNEY United States Patent Office 2,723,642
Patented Nov. 15, 1955

2,723,642

COMBINATION SPEEDOMETER AND FUEL METER FOR AUTOMOBILES

Richard H. Manning, Jamaica, N. Y.

Application March 20, 1953, Serial No. 343,706

3 Claims. (Cl. 116—114)

This invention relates to indicating devices and, more particularly, to a device for indicating simultaneously the mileage per gallon of gas in automobiles, the safe braking distance at various speeds, and the speed at which the vehicle is traveling.

It is an object of the present invention to provide an indicating device which is actuated by the accelerator of the car and which includes a dial calibrated to show at various speeds the mileage per gallon of gas, this dial also including a speedometer scale and a dial calibrated to show the safe braking distance, both of which cooperate with a conventionally actuated speedometer needle.

It is still another object of the present invention to provide a device of the above type in which the sensitivity of the indicator needle may be selectively varied depending upon the type or make of car in which the device is installed.

It is still another object of the present invention to provide a device of the above type which may be built into conventional speedometer constructions now on the market.

It is still another object of the present invention to provide an indicator of the above type wherein the operating mechanism is mounted in back of conventional speedometer dials of the rotating needle type.

It is still another object of the present invention to provide an indicator of the above type which is adapted to be used with conventional magnetic and centrifugal type speedometers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of an indicating device embodying the features of the present invention and showing the same mounted on the dashboard of a car.

Fig. 2 is a vertical sectional view taken along line 2—2 of Fig. 1.

Fig. 3 is a rear elevational view of the device looking along line 3—3 of Fig. 2.

Fig. 4 is a front elevational view of a modified form of the present invention and showing the same mounted on the dashboard of a car.

Fig. 5 is a sectional view taken along line 5—5 of Fig. 4.

Referring more in detail to the drawings, in which similar reference numerals identify corresponding parts throughout the several views, there is shown in Figs. 1–3 an indicating device, referred to collectively as 10, and including a cylindrical speedometer casing 11 mounted in the dashboard 12 in the usual manner of such constructions.

The casing 11 is open at the front and turned in as at 13 whereby to provide a peripheral lip adapted to abut the periphery of glass 14, the glass 14 being retained against the lip 13 by means of a ring or bushing 15 positioned adjacent its inner face, substantially as illustrated in Fig. 2.

A dial 16 is suitably secured within the casing 11 behind the ring 15 and is provided on its front face with the usual speedometer scale 17 and, in addition, with an outer scale 18 calibrated to indicate the maximum safe braking distance at various speeds and an inner scale 19 calibrated to indicate the miles per gallon of gas, also at various speeds, the scale 19 cooperating with an indicating needle to be hereinafter described.

The usual speedometer needle 20 is fixedly carried at the outer end of the usual shaft 21, the latter passing rearwardly through an opening in dial 16 and being connected at its rear end to a conventional speedometer mechanism, not shown. This mechanism is mounted rearward of dial 16. It forms no part of the present invention and will not, therefore, be described in detail.

A circular plate 22 is suitably secured within the casing 11 directly behind the dial 16, reinforcing the latter and provided with an opening receiving the rearwardly extending shaft 21.

The openings in the plate 22 and the dial 16 are somewhat larger than the shaft 21 and rotatably mount a sleeve 23 extending forwardly of the dial 16 to terminate just short of needle 20, as shown in Fig. 2, the inside diameter of sleeve 23 being larger than the outside diameter of shaft 21 permitting freedom of movement therebetween. The sleeve 23 extends rearwardly of the plate 22 and is rotatably supported in a bracket 24, the latter comprising a wall 25 parallel to the plate 22 and provided with the bearing opening which receives the sleeve 23, a pair of side walls 26 which extend toward the rear face of plate 22 and a pair of flanges 27 at the ends of side walls 26 and by means of which the bracket 24 is riveted or welded to the plate 22.

An indicator needle 28 is fixedly mounted on the front end of sleeve 23 behind needle 20 and extends to the bottom of scale 19, permitting the needle 28 to be read in connection with scale 19, as will be obvious.

A pinion gear 29 is fixedly mounted on sleeve 23 intermediate plate 22 and wall 25 of bracket 24.

The upper portion of plate 22 is provided with a bearing opening 30 in which is rotatably mounted one end of a shaft 31, as shown in Fig. 2, the shaft 31 extending rearwardly of plate 22 beneath the hood of the car and being rotatably mounted intermediate its ends by means of suitable bearing brackets, not shown.

A rake gear or gear segment 32 having a curved side 33 following the contour of the periphery of casing 11, a straight side 34 and a toothed side 35 is fixedly mounted on the forward end of shaft 31, with the toothed side 35 in mesh with pinion gear 29, as shown in Fig. 3.

A ring spring 36 is secured as at 37 within the casing 11 directly behind plate 22, the ring continuing around the inner wall of the casing until it passes below shaft 31 where it is engaged by a pin 38 fixedly carried on the rear face of rake gear 32. It will be noted from Fig. 2 that the spring 36 is cut out, as at 39, to accommodate the gear 32.

Thus, the spring 36 acting on pin 38 will normally urge the gear 32 to the position shown in full lines in Fig. 3, this position being the "zero" position. The fixed angular disposition of the needle 28 on the sleeve 23 is such as to read "zero" on the scale 19 when the gear 32 is in the above position. The speedometer needle 20 indicates the speed (or miles per hour), whether free wheeling or in gear, and the braking distance (scale 18) is governed by the speed, therefore the pointer 20 indicates the M. P. H. and the braking distance simultaneously. Pointer 28 shows only the miles per gallon. The M. P. H.

and the braking distance, it will be noted, are shown together on the dial 16.

The rear end of shaft 31 fixedly mounts a crank arm 40 having a plurality of longitudinally spaced openings 41 at its free end and by means of which it is pivotally connected to a pull rod 42 by means of a pin 43 and cotter pins 44, as shown in Figs. 2 and 3. The bottom of pull rod 42 is tensionally connected to the top of the foot pedal or accelerator, not shown, in suitable manner whereby upon downward pressure on the accelerator by the foot of the driver the pull rod 42 will be caused to move downwardly.

This moves the crank arm 40 in a corresponding manner resulting in the displacement of the gear 32 about shaft 31 against the action of ring spring 36, the extreme displaced position being shown in dotted outline in Fig. 3. It will be noted that the displacement of the gear 32 is limited by the abutment of the lower end of side 34 against the inner wall of casing 11, while in the "zero" position the movement in the opposite direction is limited by the abutment of side 33 with the inner wall of casing 11.

In operation, downward movement of the accelerator when starting the car will cause the needle 28 to move clockwise along the dial 19, the gear ratio between the rake gear 32 and the pinion gear 29 being such as to cause the needle 28 to make a complete revolution clockwise when the accelerator is pushed to the floor. After the car is in motion, downward pressure on the accelerator will be decreased, permitting the needle 28 to move back along the dial 19 in a counterclockwise direction to an intermediate position.

Since the mileage per gallon is inversely proportional to the rate at which the gas is fed or the downward movement of the accelerator, the scale 19 is calibrated to show the mileage per gallon, the markings decreasing in magnitude as the accelerator is depressed or in a clockwise direction, as shown in Fig. 1.

Since the safe braking distance is directly proportional to the speed as indicated by speedometer needle, the scale 18 is calibrated to show the safe braking distance in feet, the magnitude of the markings increasing directly with the scale 17. The braking distance is not indicated by the M. P. G. pointer, but by the speedometer pointer.

Once the scale 19 has been calibrated for a particular car, the device may be transferred to a different car without recalibrating the scale 19 by making use of the adjustable connection between the pull rod 42 and the crank arm 40, namely, by moving the pin 43 into a different one of the longitudinally spaced openings 41.

It will be noted that the mechanism for operating the mile per gallon indicator needle is attached to the back of the speedometer dial in a ready manner, and that the assembly may be located above or below the speedometer shaft.

Referring now particularly to Figs. 4 and 5, there is shown a modified form of the present invention, referred to collectively as 10', and differing from the first form in the application of the device to magnetic and centrifugal type speedometers.

The dashboard 12' contains the usual window opening 45 permitting observation of the usual drum 46 carrying the speedometer scale, the window 45 being closed by a magnifying glass 47 secured in place by a frame 48 suitably secured to the dashboard 12' around opening 45. The drum 46 is fixedly mounted at the bottom of the usual speedometer shaft 21', the latter extending upwardly to where it is connected to the usual centrifugal speedometer mechanism, not shown. This mechanism for imparting angular motion to the shaft 21' to thereby rotate the drum 46 forms no part of the present invention, being of conventional type, and has not, therefore, been shown or described in detail.

A pair of horizontal, vertical spaced plates 49 and 50 are suitably mounted above the drum 46 behind dashboard 12', these plates being vertically aligned with each other and with the center of the drum 46. It will be noted that the lowermost plate 50 is freely spaced above the top of the drum 46 for a purpose to be hereinafter referred to.

The plates 49 and 50 are provided with openings which are aligned with the shaft 21', permitting the latter to pass upwardly therethrough. These aligned openings are somewhat larger than the shaft 21' and serve as bearings for an elongated sleeve 23'. The sleeve 23' is retained against vertical displacement by fixedly mounted rings 51 and 52, as shown in Fig. 4, the bottom end of the sleeve 23' terminating just short of the top of drum 46. The inside diameter of sleeve 23' is greater than the outside diameter of shaft 21', permitting them to rotate freely with respect to each other.

A second drum 53 is fixedly mounted on the lower portion of sleeve 23' below plate 50 and carries on its periphery a scale 54 calibrated in miles per gallon in a manner similar to the scale 19 of the first form. The speedometer drum 46 also carries below the scale 54 a scale 55 calibrated so as to yield the safe braking distance at various speeds, in a manner similar to the scale 18 of the first form. As shown in Fig. 4, portions of both of these scales are visible through the window 45 along with the speedometer scale.

It will be noted that the scale 55 could also be located below the speedometer scale, if desired.

A pinion gear 29' is fixedly mounted on the sleeve 23' above the drum 53 and plate 50 for a purpose to be hereinafter referred to.

A screw 56 having a head 57 and a threaded end 58 connects the plates 49 and 50 by means of a nut 59, as shown in Fig. 4. A rake gear 32' is rotatably mounted on the smooth, cylindrical portion of screw 56 and is provided with teeth 35' which mesh with pinion gear 29'.

A spring 60 is positioned on top of the gear 32', as shown in Fig. 5, one end thereof being connected to the inner face of dashboard 12' by means of a bracket 61 while the other end thereof passes through a suitable opening provided near the edge 33' of gear 32'. The spring 60 thus normally retains the gear 32' in the "zero" position shown in Fig. 5, a pin 62 serving to limit the displacement by abutment with the edge 34' of gear 32'. The fixed angular disposition of drum 53 on sleeve 23' is such as to place the "zero" points of scale 54 directly behind window 45 when the gear 32' is in the above position.

A cable 63 is secured at one end to the gear 32' by means of a screw 64, as shown in Fig. 5, the other end of cable 63 passing downwardly over a pulley 65 suitably secured to casing 66. The lower end of this cable is suitably connected to the top of the accelerator, not shown, so as to subject the cable 63 to a slight tension when the accelerator is in its uppermost position relative to the floor, this tension being at the same time insufficient to displace gear 32' from its "zero" position.

Upon downward movement of the accelerator when starting the car, the cable 63 will be caused to move toward the floor of the car, moving the gear 32' in a counterclockwise direction against the action of the spring 60. This rotates pinion gear 29' and drum 53 in a clockwise direction, as indicated by the arrows of Fig. 5, causing the scale 54 to pass behind the window 45. The extreme displacement of the gear 32' is limited by a pin 67 abutting the side 33' of gear 32'.

A hairline 68 provided in the center of glass 47 cooperates with the moving scale 54 to yield the miles per gallon at various speeds in the same manner as the scale 19 and needle 28 of the first form.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a speedometer including a dial having a scale calibrated to yield the speed of the car, a central, rotating shaft in operative engagement with the speedometer mechanism, and an indicator carried by the shaft and cooperating with the speedometer scale, that improvement which comprises a second scale on the dial calibrated to indicate the distance per unit quantity of gas at various speeds, a third scale on the dial calibrated to indicate the safe braking distance at various speeds and cooperating with said speedometer needle, an elongated rotatable sleeve surrounding and freely spaced from the central shaft, an indicator carried by the forward end of said sleeve and adapted to cooperate with said second scale, a pinion gear fixedly mounted on said sleeve rearwardly of said indicator and the speedometer dial, a rake gear rotatably mounted rearward of the dial and in mesh with said pinion gear, means interconnecting said rake gear and the accelerator of the car whereby downward movement of the accelerator will be transmitted as angular motion of said rake gear, and spring means urging said rake gear into a "zero" position.

2. In a speedometer including a dial having a scale calibrated to yield the speed of the car, a central, rotating shaft in operative engagement with the speedometer mechanism, and an indicator carried by the shaft and cooperating with the speedometer scale, that improvement which comprises a second scale on the dial calibrated to indicate the distance per unit quantity of gas at various speeds, a third scale on the dial calibrated to indicate the safe braking distance at various speeds and cooperating with said speedometer needle, an elongated rotatable sleeve surrounding and freely spaced from the central shaft, an indicator carried by the forward end of said sleeve and adapted to cooperate with said second scale, a pinion gear fixedly mounted on said sleeve rearwardly of said indicator and the speedometer dial, a rake gear rotatably mounted rearward of the dial and in mesh with said pinion gear, means interconnecting said rake gear and the accelerator of the car whereby downward movement of the accelerator will be transmitted as angular motion of said rake gear, and spring means urging said rake gear into a "zero" position, said last-mentioned means comprising a rearwardly extending shaft rotatably mounted behind the dial and extending substantially parallel to the central shaft, said rake gear being fixedly mounted on said rearwardly extending shaft, a crank arm fixedly carried at the rear end of said rearwardly extending shaft and extending outwardly therefrom at substantially right angles thereto, a downwardly extending pull rod in operative engagement with the accelerator of the car, and means connecting said crank arm and said pull rod in a plurality of adjustable positions.

3. In a speedometer including a dial having a scale calibrated to yield the speed of the car, a central, rotating shaft in operative engagement with the speedometer mechanism, and an indicator carried by the shaft and cooperating with the speedometer scale, that improvement which comprises a second scale on the dial calibrated to indicate the distance per unit quantity of gas at various speeds, a third scale on the dial calibrated to indicate the safe braking distance at various speeds and cooperating with said speedometer needle, an elongated rotatable sleeve surrounding and freely spaced from the central shaft, an indicator carried by the forward end of said sleeve and adapted to cooperate with said second scale, a pinion gear fixedly mounted on said sleeve rearwardly of said indicator and the speedometer dial, a rake gear rotatably mounted rearward of the dial and in mesh with said pinion gear, means interconnecting said rake gear and the accelerator of the car whereby downward movement of the accelerator will be transmitted as angular motion of said rake gear, and spring means urging said rake gear into a "zero" position, said last-mentioned means comprising a rearwardly extending shaft rotatably mounted behind the dial and extending substantially parallel to the central shaft, said rake gear being fixedly mounted on said rearwardly extending shaft, a crank arm fixedly carried at the rear end of said rearwardly extending shaft and extending outwardly therefrom at substantially right angles thereto, a downwardly extending pull rod in operative engagement with the accelerator of the car, and means connecting said crank arm and said pull rod in a plurality of adjustable positions, said means connecting said crank arm and pull rod comprising said crank arm at the outer end having a plurality of longitudinally spaced openings, said pull rod at the top thereof having a bifurcated portion receiving the outer end of said crank arm therebetween, said bifurcated portion on each side having transversely aligned openings adapted to be aligned with one of said openings in said crank arm, and a pin passing through a selected one of said crank arm openings and said openings in said bifurcated portion.

References Cited in the file of this patent

UNITED STATES PATENTS

| | | |
|---|---|---|
| 1,181,566 | Bowden | May 2, 1916 |
| 1,479,873 | Schroeder | Jan. 8, 1924 |
| 1,552,119 | Davis | Sept. 1, 1925 |
| 1,660,641 | Banning | Feb. 28, 1928 |
| 2,169,048 | Howe | Aug. 8, 1939 |
| 2,175,129 | Rolfson | Oct. 3, 1939 |
| 2,454,393 | Leonard | Nov. 23, 1948 |
| 2,522,299 | Redue | Sept. 12, 1950 |
| 2,649,709 | Sturtz | Aug. 25, 1953 |

FOREIGN PATENTS

| | | |
|---|---|---|
| 139,974 | Switzerland | July 16, 1930 |